United States Patent
Poteet et al.

(10) Patent No.: US 11,131,624 B2
(45) Date of Patent: Sep. 28, 2021

(54) COMPACT FOURIER TRANSFORM INFRARED SPECTROMETER

(71) Applicant: Lightsense Technology, Inc., Tucson, AZ (US)

(72) Inventors: Wade Martin Poteet, Vail, AZ (US); Terje A. Skotheim, Tucson, AZ (US)

(73) Assignee: LIGHTSENSE TECHNOLOGY, INC., Tucson, AZ (US)

( * ) Notice: Subject to any disclaimer, the term of this patent is extended or adjusted under 35 U.S.C. 154(b) by 0 days.

(21) Appl. No.: 16/738,148

(22) Filed: Jan. 9, 2020

(65) Prior Publication Data
US 2020/0217788 A1    Jul. 9, 2020

Related U.S. Application Data

(60) Provisional application No. 62/790,327, filed on Jan. 9, 2019.

(51) Int. Cl.
*G01J 3/45* (2006.01)
*G01N 21/35* (2014.01)
(Continued)

(52) U.S. Cl.
CPC .............. *G01N 21/35* (2013.01); *G01J 3/021* (2013.01); *G01J 3/42* (2013.01); *G01J 3/45* (2013.01);
(Continued)

(58) Field of Classification Search
CPC ................ G01N 21/35; G01N 21/552; G01N 2021/3595; G01N 2201/0221; G01J 3/42; G01J 3/021; G01J 3/45; G01J 3/4532
See application file for complete search history.

(56) References Cited

U.S. PATENT DOCUMENTS

| 6,229,614 B1* | 5/2001 | Larsen | G01J 3/453 |
| | | | 356/451 |
| 8,344,323 B1* | 1/2013 | Hartley | A61B 5/1455 |
| | | | 250/340 |

(Continued)

OTHER PUBLICATIONS

ASPECTUS GmbH, "Mid-Infrared Spectroscopy," 2021, 2 pages, Retrieved from the Internet on Apr. 21, 2021 at URL: aspectus-gmbh.com/mid-infrared-spectroscopy.html#:~:text=The%20IR%20Sphinx%20products%20are,or%20of%205.5-11.0%20µm.

(Continued)

*Primary Examiner* — Jonathan M Hansen
(74) *Attorney, Agent, or Firm* — Jaffery Watson Mendonsa & Hamilton LLP

(57) ABSTRACT

Systems and methods are disclosed herein for measuring a fundamental mode vibrational spectrum of materials and substances in the Mid-IR spectral range of 2.5 µm to 14 µm wavelength. In one embodiment, a Mid-infrared FT-IR spectrometer system measures, identifies, or quantifies substances in the spectral range 2.5 µm to 14 µm. The system includes an infrared Micro-Electro-Mechanical System (MEMS) single element emitter light source. The light source is configured in operation to be electrically pulsed and to emit electromagnetic radiation in the wavelength range from 2.5 µm to 14 µm and with integral energy concentrating optic to provide energy for a spectral absorption process. A scanning beam splitter is positioned in an interferometer optical path with fixed angle mirrors and a thermal detector having a sensitivity to determine a maximum optical sensitivity of the system.

27 Claims, 4 Drawing Sheets

(51) Int. Cl.
  *G01J 3/42* (2006.01)
  *G01J 3/02* (2006.01)
  *G01N 21/552* (2014.01)
(52) U.S. Cl.
  CPC ... *G01N 21/552* (2013.01); *G01N 2021/3595* (2013.01)

(56) References Cited

U.S. PATENT DOCUMENTS

2016/0146722 A1\* 5/2016 Koerner ............. G01B 9/02091
                                                          356/301
2020/0141866 A1\* 5/2020 Gerwert ................. G01N 21/64

OTHER PUBLICATIONS

AZO Materials, "FluidScan Q1200: Portable Marine Base Number Analyzer," 2021, 5 pages, Retrieved from the Internet on Apr. 21, 2021 at URL: azom.com/equipment-details.aspx?EquipID=4231.

G. Lawson et al., "Counterfeit Tablet Investigations: Can ATR FT/IR Provide Rapid Targeted Quantitative Analyses?," Journal of Analytical & Bioanalytical Techniques, 2014, 6 pages, vol. 5, Issue 5.

H. Schumacher et al., "Applications of Microstructured Silicon Wafers as Internal Reflection Elements in Attenuated Total Reflection Fourier Transform Infrared Spectroscopy," Applied Spectroscopy, 2010, pp. 1022-1027, vol. 64, No. 9.

S. De Bruyne et al., "Applications of Mid-Infrared Spectroscopy in the Clinical Laboratory Setting," Critical Reviews in Clinical Laboratory Sciences, 2018, 21 pages, vol. 55, No. 1, Taylor & Francis.

Selectscience, "The Ocean MZ5 Miniature Spectrometer for MIR Analysis," Jan. 3, 2019, 3 pages, Retrieved from the Internet on Apr. 21, 2021 at URL: selectscience.net/SelectScience-TV/Videos/the-ocean-mz5-miniature-spectrometer-for-mir-analysis/?videoID=4472.

Thermo Fisher Scientific, "Portable Analysis for Material ID," 2021, 3 pages, Retrieved from the Internet on Apr. 21, 2021 at URL: thermofisher.com/us/en/home/industrial/spectroscopy-elemental-isotope-analysis/portable-analysis-material-id.html.

\* cited by examiner

COMPACT FOURIER TRANSFORM INFRARED SPECTROMETER

RELATED APPLICATIONS

This application claims the priority of U.S. Provisional Application No. 62/790,327, filed Jan. 9, 2019, the contents of which are incorporated by reference herein.

FIELD

Embodiments of the invention pertain to a compact Fourier transform infrared spectrometer.

BACKGROUND

Absorption spectroscopy refers to spectroscopic techniques that measure the absorption of radiation, as a function of frequency or wavelength, due to its interaction with a sample. The sample absorbs energy, i.e., photons, from the radiating field. The intensity of the absorption varies as a function of frequency, and this variation is the absorption spectrum. Absorption spectroscopy is employed as an analytical chemistry tool to determine the presence of a particular substance in a sample and, in many cases, to quantify the amount of the substance present. Infrared and ultraviolet-visible spectroscopy are particularly common in analytical applications. There are a wide range of experimental approaches for measuring absorption spectra. The most common arrangement is to direct a generated beam of radiation at a sample and detect the intensity of the radiation that passes through it. The transmitted energy can be used to calculate the absorption. The source, sample arrangement and detection technique vary significantly depending on the frequency range and the purpose of the experiment.

A prior method used for mid-infrared substance measurements is the laboratory (Fourier Transform Infra-Red) FT-IR spectrometer. One method for IR spectral measurements consists in placing a sample onto a sampling membrane, where the sample is dried, and then mounted with some amount of pressure against a crystal in the spectrometer's light path for analysis, where the crystal is transparent for IR radiation and the IR light undergoes total reflection at the crystal-sample interface. An evanescent wave penetrates the interface into the sample and the absorption of the evanescent wave in the sample alters the spectrum of the reflected light in a process called Attenuated Total Reflection (ATR). Gaseous samples are typically introduced using a sample cell or flow cell, and liquids can still be analyzed using a flow cell as well. Spectral resolution of these instruments is adjustable from less than 1 $cm^{-1}$ to about 30 $cm^{-1}$. Cost for these instruments of $20,000-$90,000 is high and prohibitive for most small laboratories and not at all practical for applications in which small size, robustness, and low cost is necessary. These applications include point-of-care instruments for individual medical patient applications; chemical and materials analysis in the field; in-line and real-time industrial process control; and consumer applications such as measuring the ripeness of food or adulteration of drugs.

Various mid-IR instruments have been recently introduced to the market and these instruments utilize linear variable spectral filters [LVF] atop a detector array with a variety of energy sources, depending on the wavelength being measured. These instruments cover only a limited spectral range for a single LVF and are costly to produce, selling for $10,000 or more at this time. These instruments may be relatively small though.

SUMMARY

For one embodiment of the present invention, systems and methods for measuring the fundamental mode vibrational spectrum of materials and substances in the spectral range of 2.5 µm to 14 µm wavelength are disclosed herein. In one example, a Mid-infrared FT-IR spectrometer system measures, identifies, or quantifies substances in the spectral range of 2.5 µm to 14 µm. The system includes an infrared Micro-Electro-Mechanical System (MEMS) single element emitter light source. The light source is configured in operation to be electrically pulsed and to emit electromagnetic radiation in the wavelength range from 2.5 µm to 14 µm and with integral energy concentrating optic to provide energy for a spectral absorption process. A scanning beam splitter is positioned in an interferometer optical path with fixed angle mirrors and a sensitivity of a thermal detector determines a maximum optical sensitivity of the system.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Embodiments of this invention relate generally to the field of substance and material detection using a novel, compact, inexpensive mid-infrared [MIR] spectrometer configured to measure the fundamental mode absorption or transmission vibrational spectrum of those materials and substances in the spectral range of 2.5 µm to 14 µm wavelength [715 $cm^{-1}$-4000 $cm^{-1}$]. Both identification and quantification from single and multiple-substance mixtures can result from these measurements. More specifically, the present invention relates to these mid-infrared measurements using the described optimized Fourier Transform infrared [FT-IR] spectrometer with an Attenuated Total Reflection (ATR) silicon crystal, or an enhanced silicon ATR, being utilized for the sample application. The particular novel combination of components does not currently exist in the literature, including the method of implementing the interferometric scan, thus, the system is unique, and the implementation provides a compact, inexpensive solution for sensitive MIR measurements.

Embodiments of the present invention include a spectrometer system that is sufficiently small to be used as a handheld device. This spectrometer system is capable of resolution as low as 1 cm$^{-1}$, possesses the sensitivity of a typical FT-IR laboratory instrument and surpasses the sensitivity of the currently available LVF instruments by 3× or more. Further, the estimated manufacturing cost per unit in modest quantity (>500 units) is less than $600, making it affordable for almost any critical laboratory or medical patient application.

FT-IR spectrometers have been designed, described, and utilized in the laboratory for some time, but none have used the ATR/enhanced ATR design of this invention in the configuration described. Moving the beam splitter in the fashion described instead of one of the mirrors usually found in FT-IR instruments is also unique to embodiments of this invention.

Figure 1:
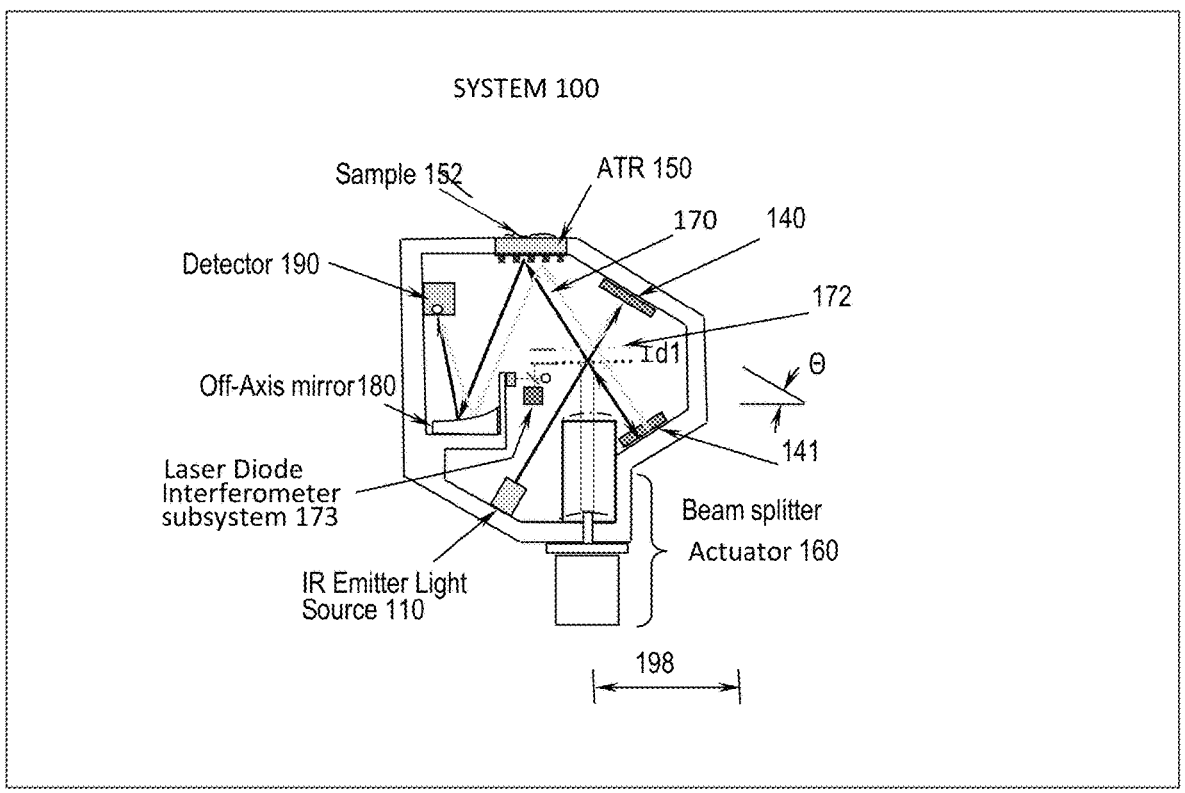
FIG. 1 illustrates an exemplar spectrometer system in accordance with one embodiment.

FIG. 1 illustrates an exemplar FT-IR spectrometer system 100 in accordance with one embodiment. In one example, the system 100 is a handheld device having a scale 198 (e.g., scale of 20 mm, scale of 10-30 mm). Preliminary optical ray-trace and efficiency/resolution estimates have been performed for one embodiment using Zemax®, forming a foundation for the optical design disclosed for the mid-IR FT-IR spectrometer. In one example, the present innovative design will provide spectral coverage over the range 715 cm$^{-1}$ to 4000 cm$^{-1}$ [2.5 µm-14 µm] with adequate sensitivity [measurement time <5 seconds], and a maximum resolution of 0.85 cm$^{-1}$.

A beam splitter is an optical device that splits a beam of light into two beams of light. In regards to a scanning beam splitter, the present design scans the beam splitter 172 and keeps the two interferometer mirrors 140, 141 fixed and solidly mounted at fixed angles. This is advantageous because motion of the beam splitter in the direction shown in FIG. 1 results in multiplication of the optical path difference, δ, according to the equation δ=2h, where h is the length of the optical path change along the direction of the optical beam for each beam during the scan.

This is true because the lower path length increases as the upper path length decreases by the same amount with this configuration.

When a beam splitter actuator 160 causes the beam splitter 172 to actuate or move by an amount $d_1$ as shown in FIG. 1, then $d_1 = h \times \cos \theta$ With the design shown as an example, θ=30°, δ=11.7 mm & h=δ/2 [yields spectral resolution of 0.85 cm$^{-1}$] so that $d_1 = 5$ mm This total motion per scan is less than ¼$^{th}$ the motion required by a moving mirror system for similar resolution. Note that this motion of the beam splitter 172 produces a displacement in the interferometer's output beam 170 as shown in FIG. 1. This displacement increases the overall size of the output beam 170 that must be directed to the sample 152 on ATR plate 150 and subsequently to the detector 190. The displaced beam is, however, parallel to the beam from the "0" position of the beam splitter. An off-axis parabolic mirror 180 (e.g., reflector) collects the entire beam exiting the ATR plate and focuses it onto the detector 190 for subsequent processing of the interferogram.

Precision motion for the beam splitter can be provided by a number of mechanisms or piezoelectric actuators. In one example, the present design utilizes two flexures (UROP-style) made of 500 µm thickness etched-through silicon. This pattern is straightforward to produce, and results in an inexpensive flexure of extremely high stiffness. Other materials can be utilized for this component, but this example concentrates on low cost. Either a voice-coil or other actuator can drive the flexure, and a simple position sensor provides feedback for a closed-loop servo to control the beam splitter motion in this example. Since the spectrometer system 100 is inherently mass-balanced, tilt, motion, and vibration are highly suppressed.

A reference signal can be provided for stabilization. In one embodiment, the present design utilizes a 785 nanometer (nm) stabilized laser diode channel of laser diode interferometer subsystem 173 to provide a signal for the beam splitter servo and sampling electronics that periodically measures the mechanical motion. In one embodiment, the present design utilizes a reference channel employing the main FT-IR beam splitter as its moving element for calibration of the scanning relative to the spectral scale. This embodiment utilizes scanner electronics that include a linear proportional servo+integrator to close the servo loop around the position sensor and provide stability for the scanner. Servo speed, detector sampling, and scan trigger functions are synchronized in this embodiment, and those are tied to the 785 nm laser diode interferometer subsystem 173 to maintain resolution and accuracy. Other wavelength lasers can be used to accomplish this function.

In one example, the beam splitter 172 has a coating applied to its lower surface to provide a net 50% split in the incoming light, which is then directed to each of the two fixed mirrors in the system. Material for this beam splitter can be 500 µm thickness Topsil® silicon, which is common in semiconductor manufacturing processes, and can be chosen for high transmission at the longer wavelengths. Note that this coating arrangement results in the same number of passes through the silicon beam splitter for both interferometer beams to assure balance in the overall interferometric beam combining process.

A second component in the present design is the silicon (Si) attenuated total reflection plate (ATR) 150. This plate can be an inexpensive disposable onto which the sample material 152 is applied. In one embodiment, a thin ruggedly antireflection coated Si window is installed in the spectrometer, possibly at an angle to mitigate residual reflections, so that the Si ATR plate 150 can be inserted into the spectrometer and spring-loaded onto this window or another fixed surface for consistent measurements. This embodiment allows for sealing the spectrometer optical train and filling with inert gas to reduce water vapor and $CO_2$ absorption lines in the spectrum.

Micro-machined Si ATR methods have been shown to provide enhancements in sample absorption of a factor of 2 to 4 compared to typical sample absorption schemes. This present design can also utilize a signal-enhanced Si ATR plate that has been shown to provide a signal/noise enhancement of a factor of 10 to 18 compared to a standard diamond ATR that is used commercially in FT-IR bench instruments.

Etched structures with dimensions smaller than the mid-IR wavelengths are required on the sample side of the plate to achieve this enhancement. The enhanced ATR plate can achieve much higher performance than a standard grating instrument in the MIR.

The structure on the sample side of the enhanced Si ATR plates has been shown to be able to separate plasma/serum from whole blood as effective as centrifuging, opening entirely new avenues for quick and low-cost whole blood analysis.

In one example, the Si ATR plate is based on a double-side-polished (100) silicon wafer with v-shaped grooves of f111g facets on their backside. These facets are formed by crystal-oriented anisotropic wet etching within a conventional wafer structuring process (e.g., typical wafer thickness of 500 µm). These facets are used to couple infrared radiation into and out of the plate. In contrast to the application of the commonly used multiple-internal reflection ATR elements, these elements provide single-reflection measurement at the sample side in the collimated beam. Due to the short light path within the ATR, absorption in the silicon is minimized and allows coverage of the entire mid-infrared region with a high optical throughput, including the range of silicon lattice vibrations from 300 to 1500 $cm^{-1}$.

In addition to typical ATR applications, i.e., the measurement of bulk liquids and soft materials, the application of this ATR plate to the preferred design serves three purposes: 1) enhance the sample spectral absorption, 2) provide an inexpensive disposable that is convenient for sample application, and 3) present a sufficiently rugged surface that will withstand physician handling.

Figure 2:
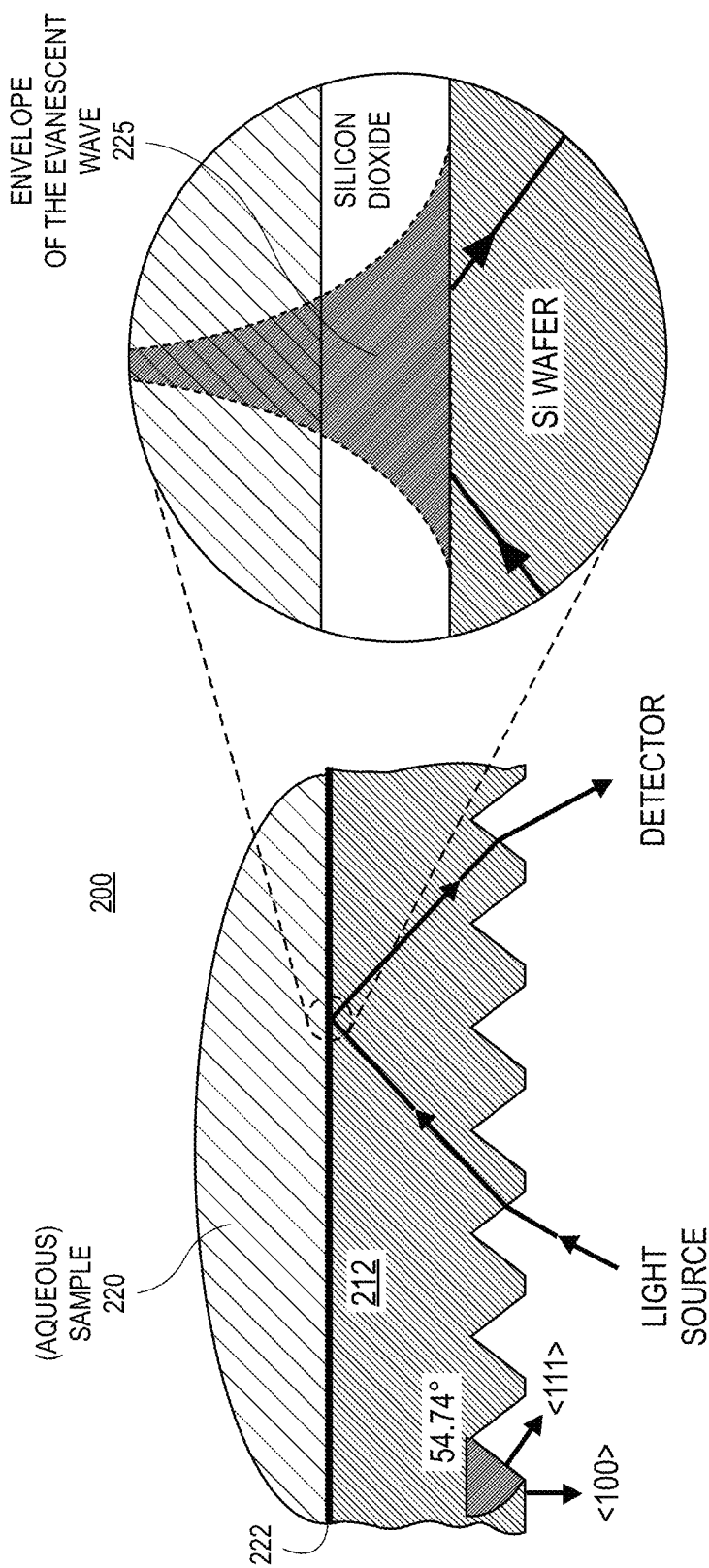
FIG. 2 illustrates an optical path with respect to a Si ATR plate having a sample in accordance with one embodiment.

An illustration of the optical path of this ATR plate is shown in FIG. 2 in accordance with one embodiment. Light from a light source enters the ATR plate 210 at a specific fixed angle of incidence, is refracted to a front sample surface 222 of sample 220 (e.g., aqueous sample 220), creates an evanescent wave 225 which penetrates the sample 220 at a certain depth (e.g., between 0.5 and 2 µm), then is refracted by the Si ATR plate 210 where it exits the ATR at the input angle of incidence.

IR radiation containing the absorption information (e.g., fundamental vibration mode of each molecule from the sample, how much of each wavelength of light is absorbed by different molecules) exits the sample plate and is directed to an off-axis parabolic surface, and finally falls on a single thermopile detector.

A Collimated IR emitter energy source 110 is a miniature MEMS IR Emitter that can be used for gas sensors (e.g., $CO_2$ sensors) and commercial spectrometers. These emitters produce IR near-blackbody radiation by heating a multi-layer membrane which is suspended by a Si substrate frame to temperatures between 600° C. and 1000° C. The IR radiation energy source can contain a reflective optical surface (for example, a parabolic surface) or other suitable optic that provides collimated energy to the FT-IR spectrometer.

This spectrometer design operates with a single MEMS IR emitter, in contrast with LVF-based MIR instruments that require an expensive array of emitters in order to properly collimate the optical emission across the LVF. This is a significant cost advantage for the present design.

In one embodiment, the present design emphasizes low cost, and the embodiment illustrated in FIG. 1 represents a significant challenge to maintain sufficient sensitivity and resolution while performing the measurement of a sample in a reasonable period of time. This necessitates the use of an off-axis parabola for a focusing optic (e.g., a final focusing optic), and the mid-IR wavelengths involved permit a replicated or diamond-turned optic. This approach reduces cost for this component and opens the possibility to fabricate the parabolic surface along with an injection-molded subframe for further cost reduction.

Different embodiments of the present design may include a thermoelectric cooler and integrated controller for potential improvement to overall calibration and accuracy when operating in a varying temperature environment.

In regards to software design, in one example, a 16-bit digitizer may provide data to a small computer subsystem (e.g., device 600) that can perform all apodization, phase, and other corrections prior to applying a standard fast Fourier transform (FFT) algorithm to produce spectra of the sample. Co-adding spectra in real time or other similar data reduction scheme may result in a simple method for data presentation and analysis.

Calibration may be required because of the nature of an interferometer operating at these wavelengths. Stable FT-IR instruments may require application only about every 10 sample measurement cycles; however, because of the critical nature of the results when embodiments of the invention are used for medical applications involving patient health and diagnosis, a rigorous self-calibration at the beginning of every sample measurement to insure reliability and consistency may be implemented.

It may be advantageous to implement commercial databases so that commonly used substances can be identified and measured economically.

Currently available potentially applicable alternatives to this present design includes instruments that possess the necessary spectral coverage, their components include expensive parts and large physical footprints. The present design provides a solution for low-cost precision measuring and diagnostic tools.

These commercially available instruments have lower sensitivity for MIR measurements than the FTIR of this present design. Their components include expensive parts, such as a linear variable filter (LVF), and emitter and detector arrays, which are expensive, even in large quantities, making these devices unsuitable for POC instruments and a wide range of in-line and in-the-field uses demanding lower cost instrumentation. The LVF-based spectrometers (non-Fourier Transform) have limited spectral resolution and limited spectral coverage range in a single unit, making them high-cost for the multiple spectral range described in embodiments of the present invention.

Figure 3:
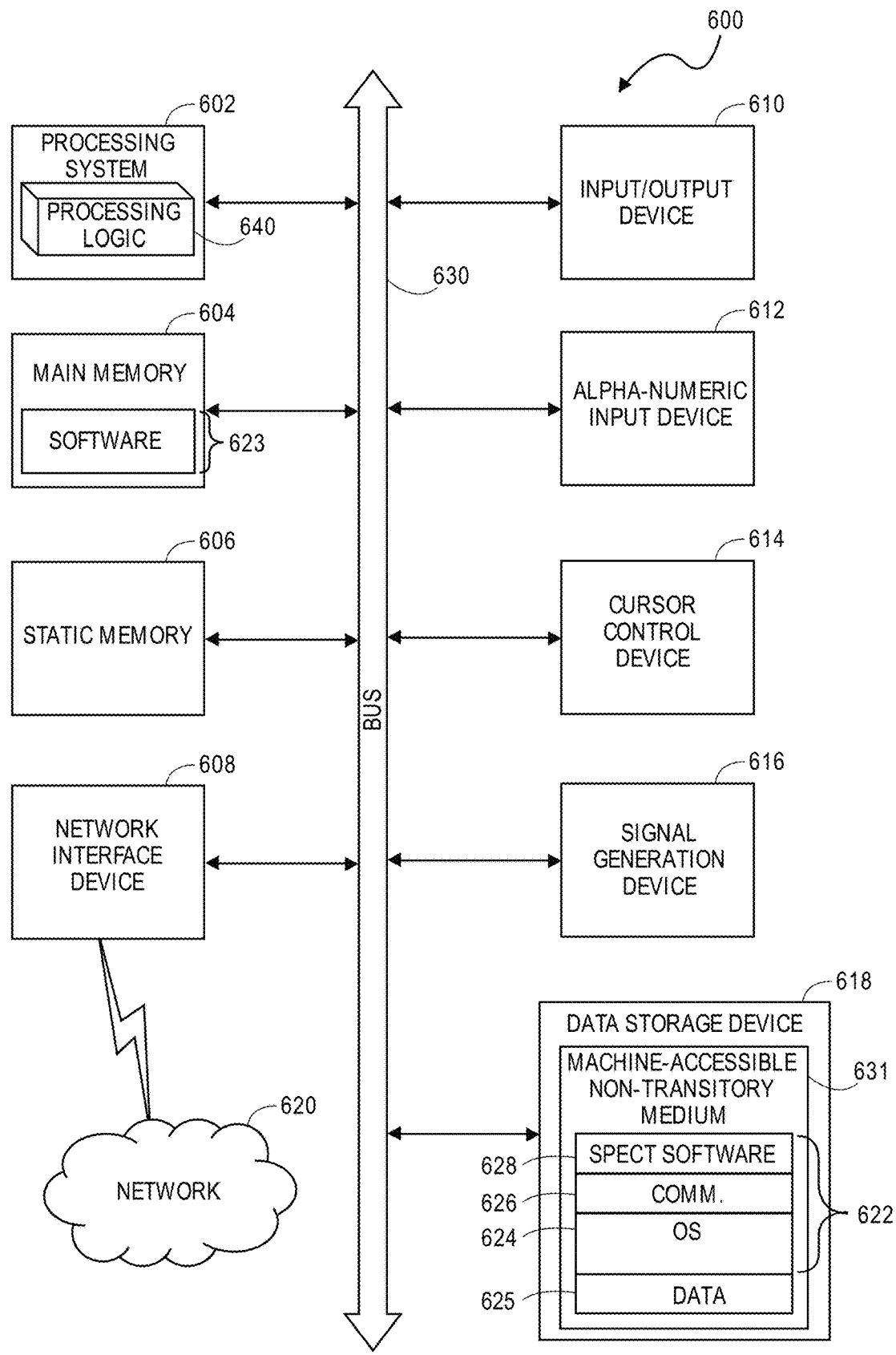
FIG. 3 illustrates a diagrammatic representation of a machine in the exemplary form of a computer system or device 600 within which a set of instructions, for causing the machine to perform any one or more of the methodologies discussed herein, may be executed.

FIG. 3 illustrates a diagrammatic representation of a machine in the exemplary form of a computer system or device 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a mobile device, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary device 600 (e.g., an electronic detector and control module 600) includes a processing system 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The electronic detector and control module comprises an electronics circuit board and computer system for corrections, storage, and analysis of measurements to identify and quantify substances in various spectral ranges (e.g., spectral range of 2.5 µm to 14 µm). The electronic detector and control module are configured to execute instructions (e.g., software 623) to perform algorithms (e.g., FFT) and analysis to determine at least one of specific substances detected and their quantity. The electronic detector and control module can be integrated with the spectrometer system 100 or a separate computer system.

The electronic detector and control module are configured to collect data (e.g., data 625) and to transmit the data directly to a remote location connected to network 620. A network interface device 608 transmits the data to the network 620. The data collected by the electronic detector and control module can be stored in data storage device 618 and also in a remote location for retrieval.

Processing system 602 represents one or more general-purpose processing devices such as a microprocessor, central processing unit, or the like. More particularly, the processing system 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system 602 may also be one or more special-purpose processing devices such as an application specific integrated circuit (ASIC), a field programmable gate array (FPGA), a digital signal processor (DSP), network processor, or the like. The processing system 602 is configured to execute the processing logic 640 for performing the operations and steps discussed herein.

The device 600 may further include a network interface device 608. The device 600 also may include an input/output device 610 or display (e.g., a liquid crystal display (LCD), a plasma display, a cathode ray tube (CRT), or touch screen for receiving user input and displaying output), an optional alphanumeric input device 612 (e.g., a keyboard), an optional cursor control device 614 (e.g., a mouse), and a signal generation device 616 (e.g., a speaker).

The data storage device 618 may include a machine-accessible non-transitory medium 631 on which is stored one or more sets of instructions (e.g., software 622) embodying any one or more of the methodologies or functions described herein. The software 622 may include an operating system 624, spectrometer software 628, and communications module 626. The software 622 may also reside, completely or at least partially, within the main memory 604 (e.g., software 623) and/or within the processing system 602 during execution thereof by the device 600, the main memory 604 and the processing system 602 also constituting machine-accessible storage media. The software 622 or 623 may further be transmitted or received over a network 620 via the network interface device 608.

The machine-accessible non-transitory medium 631 may also be used to store data 625 for measurements and analysis of the data for the spectrometer system. Data may also be stored in other sections of device 600, such as static memory 606.

In one embodiment, a machine-accessible non-transitory medium contains executable computer program instructions which when executed by a data processing system cause the system to perform any of the methods discussed herein.

Figure 4:
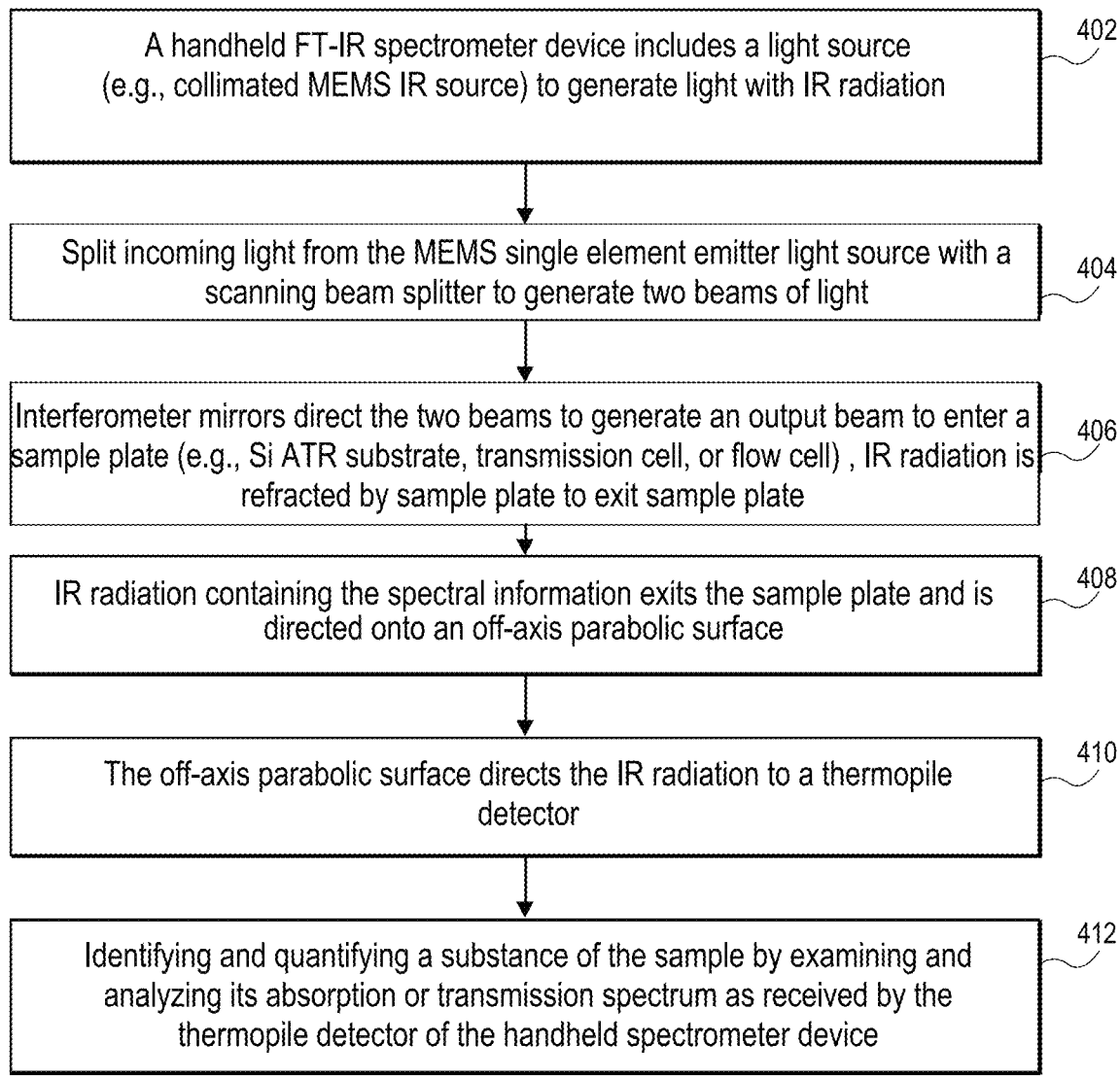
FIG. 4 illustrates a method 400 that may be executed by a FT-IR spectrometer system of a handheld device in accordance with one embodiment.

In one embodiment, a method includes at least one of identifying and quantifying a substance by examining and analyzing its absorption or transmission spectrum with a FT-IR spectrometer system. FIG. 4 illustrates a method 400 that may be executed by a FT-IR spectrometer handheld device in accordance with one embodiment.

At operation 402, the device includes a light source (e.g., collimated MEMS IR source) to generate light with IR radiation. and focus the IR radiation on a sample plate (e.g., Si ATR substrate, transmission cell, or flow cell) for in-line measurement. The light source may be electrically pulsed and emit electromagnetic radiation in the wavelength range from 2.5 µm to 14 µm and includes an integral energy concentrating optic to provide energy for a spectral absorption process.

In one example, at operation 404, the method includes splitting incoming light from the MEMS single element emitter light source with a scanning beam splitter to generate two beams of light. At operation 406, interferometer mirrors direct the two beams to generate an output beam to enter a sample plate (e.g., Si ATR substrate, transmission cell, or flow cell) for in-line measurement at a specific fixed input angle of incidence, being refracted to the front sample surface, creating an evanescent wave which penetrates the sample at a depth between 0.5 and 2 µm for the sample plate, and then the IR radiation of the beam is refracted by the sample plate (e.g., Si ATR substrate), transmission cell, or flow cell to exit at the input angle of incidence.

The IR radiation containing the spectral information exits the sample plate, transmission cell, or flow cell and is directed onto an off-axis parabolic surface at operation 408. The off-axis parabolic surface directs the IR radiation to a thermopile detector (e.g., single thermopile detector) at operation 410. At operation 412, the method includes at least one of identifying and quantifying a substance of the sample by examining and analyzing its absorption or transmission spectrum as received by the thermopile detector of the mid-infrared spectrometer system. In one example, an electronic detector and control module comprises an electronics circuit board and computer system for corrections, storage, and analysis of measurements to identify and quantify substances in the spectral range of 2.5 µm to 14 µm.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A compact Mid-infrared FT-IR spectrometer system to measure, identify, or quantify substances in the spectral range 2.5 µm to 14 µm comprising:

an infrared Micro-Electro-Mechanical System (MEMS) single element emitter light source wherein the light source is configured in operation to be electrically pulsed and to emit electromagnetic radiation in the wavelength range from 2.5 µm to 14 µm and with integral energy concentrating optic to provide energy for a spectral absorption process;

a linear scanning beam splitter in an interferometer optical path with fixed angle mirrors, the linear scanning beam splitter is configured to split incoming light from the MEMS single element emitter light source and to generate an output beam to direct on a sample; and a thermal detector having a sensitivity to determine a maximum optical sensitivity of the compact Mid-infrared FT-IR spectrometer system and to receive output energy having absorption information.

2. The spectrometer system of claim 1, further comprising:
a micromachined silicon Attenuated Total Reflection (ATR) sample plate, either as stationary or removable and disposable is utilized as a sample surface of the sample.

3. The spectrometer system of claim 2, wherein the micromachined silicon ATR is enhanced by microstructuring a front sample-holding face to increase absorption from the sample.

4. The spectrometer system of claim 1, further comprising:
an off-axis parabolic reflector to concentrate at least 80% of a spectral portion of output energy received from a micromachined silicon Attenuated Total Reflection (ATR) sample plate onto the thermal detector with minimal distortion.

5. The spectrometer system of claim 1, wherein the light source is a compact emitter and the compact Mid-infrared FT-IR spectrometer system is handheld.

6. The spectrometer system of claim 1, wherein wavelength calibration is performed external to the spectrometer.

7. The spectrometer system of claim 1, further comprising:
an external holder to contain a micromachined silicon Attenuated Total Reflection tATR) sample plate, which is either disposable or non-disposable.

8. The spectrometer system of claim 1, further comprising:
a flow cell to contain a micromachined silicon Attenuated Total Reflection (ATR) sample plate, which is either disposable or non-disposable.

9. The spectrometer system of claim 1, wherein the optical sensitivity is set by at least one of the detector size and the overall sensitivity of the detector to mid-IR radiation.

10. The spectrometer system of claim 1, wherein the spectrometer system is temperature-controlled.

11. The spectrometer system of claim 1, further comprising:
an electronic detector and control module that comprises an electronics circuit board and computer system for corrections, storage, and analysis of measurements to identify and quantify substances in the spectral range of 2.5 µm to 14 µm.

12. The spectrometer system of claim 11, wherein the electronic detector and control module are configured to execute instructions to perform algorithms and analysis to determine at least one of specific substances detected and their quantity.

13. The spectrometer system of claim 1, wherein the electronic detector and control module is configured to collect data and to transmit the data directly to a remote location.

14. The spectrometer system of claim 13, wherein the data collected by the electronic detector and control module is stored in a remote location for retrieval.

15. A method to measure, identify, or quantify substances with a mid-infrared spectrometer system comprising:
electrically pulsing and emitting light with IR radiation in a wavelength range from 2.5 µm to 14 µm with an infrared Micro-Electro-Mechanical System (MEMS) single element emitter light source;
splitting the incoming light from the MEMS single element emitter light source with a linear scanning beam splitter to generate an output beam;
directing the output beam to a sample of a sample plate; and
at least one of identifying and quantifying a substance of the sample by examining and analyzing its absorption or transmission spectrum with the mid-infrared spectrometer system.

16. The method of claim 15, further comprising:
refracting the IR radiation of the output beam to a front surface of the sample, creating an evanescent wave which penetrates the sample, and then IR radiation is refracted by the sample plate to exit at an input angle of incidence;
directing, with an off-axis parabolic reflector, the IR radiation to a thermal detector having a sensitivity to determine a maximum optical sensitivity of the system.

17. The method of claim 16, wherein the sample plate comprises a micromachined silicon Attenuated Total Reflection (ATR) sample plate, either as stationary or removable and disposable is utilized as a sample surface of a sample.

18. The method of claim 17, wherein the off-axis parabolic reflector to concentrate at least 80% of a spectral portion of the IR radiation received from the silicon ATR onto the thermal detector with minimal distortion.

19. A compact Mid-infrared FT-IR spectrometer device to measure, identify, or quantify substances in the spectral range 2.5 µm to 14 µm comprising:
an infrared Micro-Electro-Mechanical System (MEMS) single element emitter light source wherein the light source is configured in operation to be electrically pulsed and to emit electromagnetic radiation in the wavelength range from 2.5 µm to 14 µm and with integral energy concentrating optic to provide energy for a spectral absorption process; and
a linear scanning beam splitter in an interferometer optical path with fixed angle mirrors, the linear scanning beam splitter is configured to split incoming light from the MEMS single element emitter light source and to generate an output beam to direct on a sample.

20. The compact Mid-infrared FT-IR spectrometer device of claim 19, further comprising:
a thermal detector to receive output energy having absorption information of the sample for the spectral absorption process.

21. The compact Mid-infrared FT-IR spectrometer device of claim 20, further comprising:
a micromachined silicon Attenuated Total Reflection (ATR) sample plate, either as stationary or removable and disposable is utilized as a sample surface of a sample.

22. The compact Mid-infrared FT-IR spectrometer device of claim 21, wherein the micromachined silicon ATR provides signal to noise enhancement by microstructuring a front sample-holding face with dimensions of facets that are smaller than the mid-infrared wavelength range of 2.5 µm to 14 µm, wherein the facets to couple infrared radiation into and out of the micromachined silicon Attenuated Total Reflection (ATR) sample plate.

23. The spectrometer system of claim 1, wherein a gas or liquid flow cell is within a measurement optical beam to allow spectral measurements of substances passing through either of those cells.

24. The spectrometer system of claim 1, wherein the spectrometer system is configured to measure by-products of semiconductor manufacturing by examining surfaces.

25. The spectrometer system of claim 1, wherein the spectrometer system is filled with a gaseous substance whose spectral absorbance requires specification.

26. The spectrometer system of claim 1, wherein the spectrometer system is configured to measure liquids directly.

27. The spectrometer system of claim 1, wherein the spectrometer system is configured as compact or handheld to measure surfaces in medical facilities to determine presence of pathogens.

\* \* \* \* \*